LA BAW & CAMPBELL.
Carriage-Spring.
No. 36,220. Patented Aug 19, 1862.
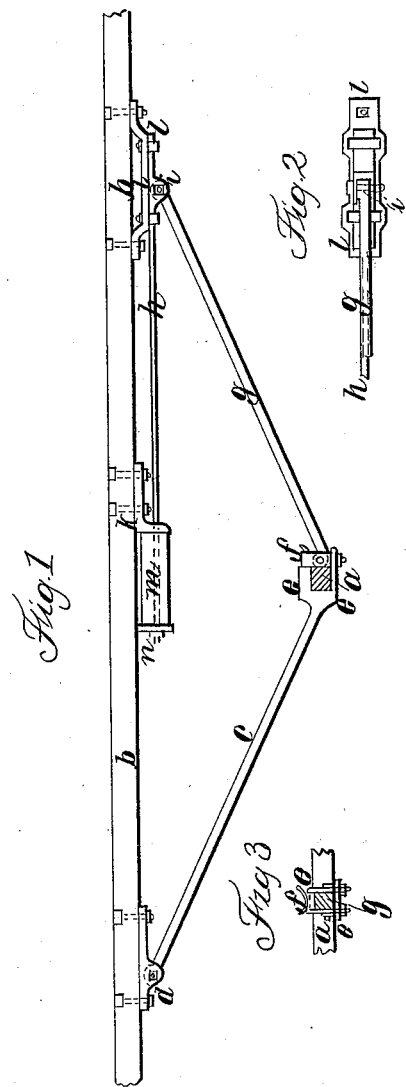
Witnesses
Lemuel W. Serrell
Thos Geo Harold
Inventors;
George W. LaBaw
Peter H. Campbell

UNITED STATES PATENT OFFICE.

GEORGE W. LA BAW AND PETER F. CAMPBELL, OF JERSEY CITY, NEW JERSEY.

IMPROVEMENT IN CARRIAGE-SPRINGS.

Specification forming part of Letters Patent No. 36,220, dated August 19, 1862.

*To all whom it may concern:*

Be it known that we, GEORGE W. LA BAW and PETER F. CAMPBELL, of Jersey City, in the county of Hudson and State of New Jersey, have invented, made, and applied to use a certain new and useful Improvement in Springs for Carriages, &c.; and we do hereby declare the following to be a full, clear, and exact description of our said invention, reference being had to the annexed drawings, making part of this specification, wherein—

Figure 1 is an elevation of our spring. Fig. 2 is an inverted plan of the slide-bar at one end, and Fig. 3 shows the clip to the axle.

Similar marks of reference denote the same parts.

Our invention consists in a combination of toggle-joint bars with a sliding bar and compressible spring, the parts being arranged as set forth, and applied between the axle and the body of the vehicle in such a manner that the toggle-joint bars through the agency of said sliding bar compress the spring endwise. By this means we are able to employ a rigid spring, such as india-rubber, and obtain an easy-riding vehicle with the amount of springing movement usually required.

In the drawings, *a* represents a portion of the axle. *b* is the side rail or bolster of a wagon or other vehicle.

*c* is a bar with an eye at one end taking a bolt through the strap or clip *d*, that is attached to *b*. The other end of this bar *c* is formed as a fork, *e*, that grasps the axle *a*. *f* is a clip uniting the ends of this fork *e*, and also forming a joint for one end of the second bar, *g*. This bar *g* is united by a joint, *i*, at the other end to the slide-bar *h*, which slides in staples on the plate *l*, and the other end of this bar *h* passes through the step *k* for the spring *m*, thence through said spring *m*, and terminating with the cap *n*. It will now be seen that the axle *a* in use is drawn along by the bar *c*, and this bar only acts as a radius, and in connection with the bar *g* forms a toggle that slides the bar *h* along, and thereby compresses the spring *m*, and the amount of motion allowed to the vehicle will depend on the strength of the spring *m* and angle between the bars *g* and *c* compared with the weight.

By providing a nut at the end of the bar *h* the spring *m* may be more or less compressed at pleasure and the amount of motion under a given pressure regulated. This spring *m* may be of rubber, as shown, or a spiral or other spring may be employed in place thereof.

When the toggle-bars *c* and *g* straighten under a heavy weight, the upper side of the fork *e* will take the rubber spring *m* against its side, and in that capacity said spring will act as a buffer. The upper side of this fork *e* may be made concave, as in Fig. 3, to take the side of said spring *m*.

What we claim, and desire to secure by Letters Patent, is—

The toggle-bars *c* and *g*, fitted as set forth, in combination with the slide-bar *h* and spring *m*, in the manner and for the purposes specified.

In witness whereof we have hereunto set our signatures this 14th day of July, 1862.

GEORGE W. LA BAW.
PETER F. CAMPBELL.

Witnesses:
LEMUEL W. SERRELL,
THOS. GEO. HAROLD.